United States Patent [19]

Curry

[11] 4,043,588

[45] Aug. 23, 1977

[54] SHUTTLE CAR WITH OPERATOR PROTECTION

[76] Inventor: Paul F. Curry, Box 356, Raven, Va. 24639

[21] Appl. No.: 691,485

[22] Filed: June 1, 1976

[51] Int. Cl.$^2$ .............................................. B60J 7/00
[52] U.S. Cl. ................................ 296/102; 296/137 B
[58] Field of Search ............... 296/137 B, 102, 137 R; 105/342

[56] References Cited

U.S. PATENT DOCUMENTS

| | | | |
|---|---|---|---|
| 2,667,379 | 1/1954 | Baze | 296/102 |
| 3,136,576 | 6/1964 | Curtin | 296/137 R |
| 3,910,629 | 10/1975 | Woodard | 296/137 B |

Primary Examiner—Robert R. Song

Attorney, Agent, or Firm—Kenyon & Kenyon, Reilly, Carr & Chapin

[57] ABSTRACT

An articulated tractor and load-carrying trailer mine shuttle car has a low profile, the tractor having a cockpit in which the operator sits transversely of the tractor and with his head above the top of the tractor so that by turning his head he can look forwardly and backwardly, the shuttle car being designed to operate in both directions. To protect the operator from falling pieces of minerals or coal, a transversely sliding canopy is provided the tractor, the canopy being spaced above the tractor's top to form front and back spaces through which the operator can look, and being transversely slidable to permit the operator to get into and out of the cockpit by sliding the canopy from over the top of the cockpit.

4 Claims, 5 Drawing Figures

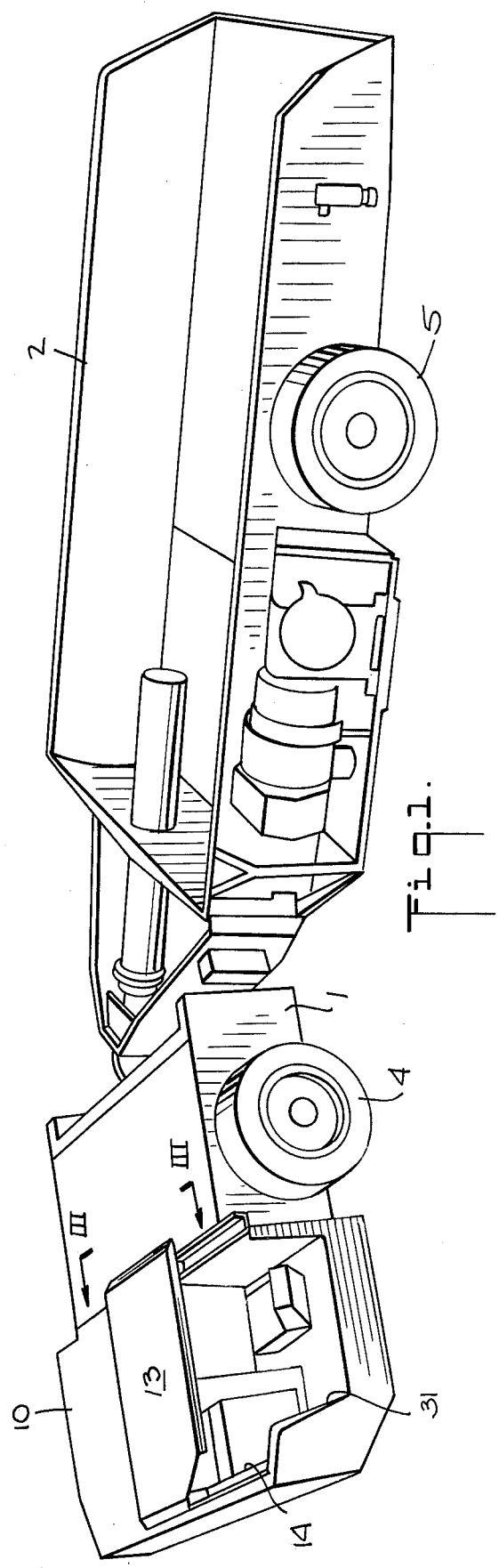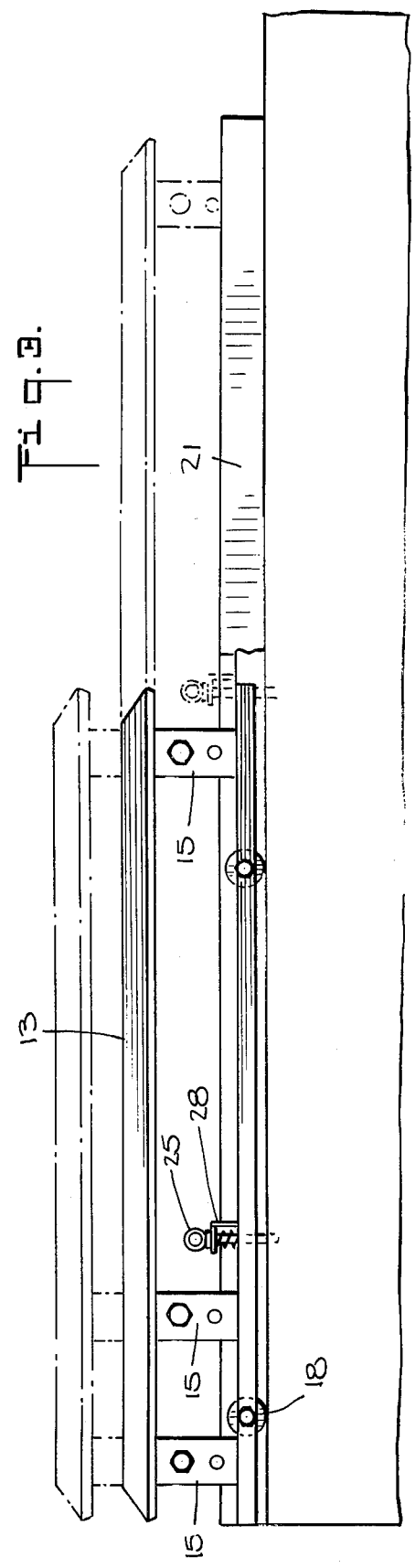

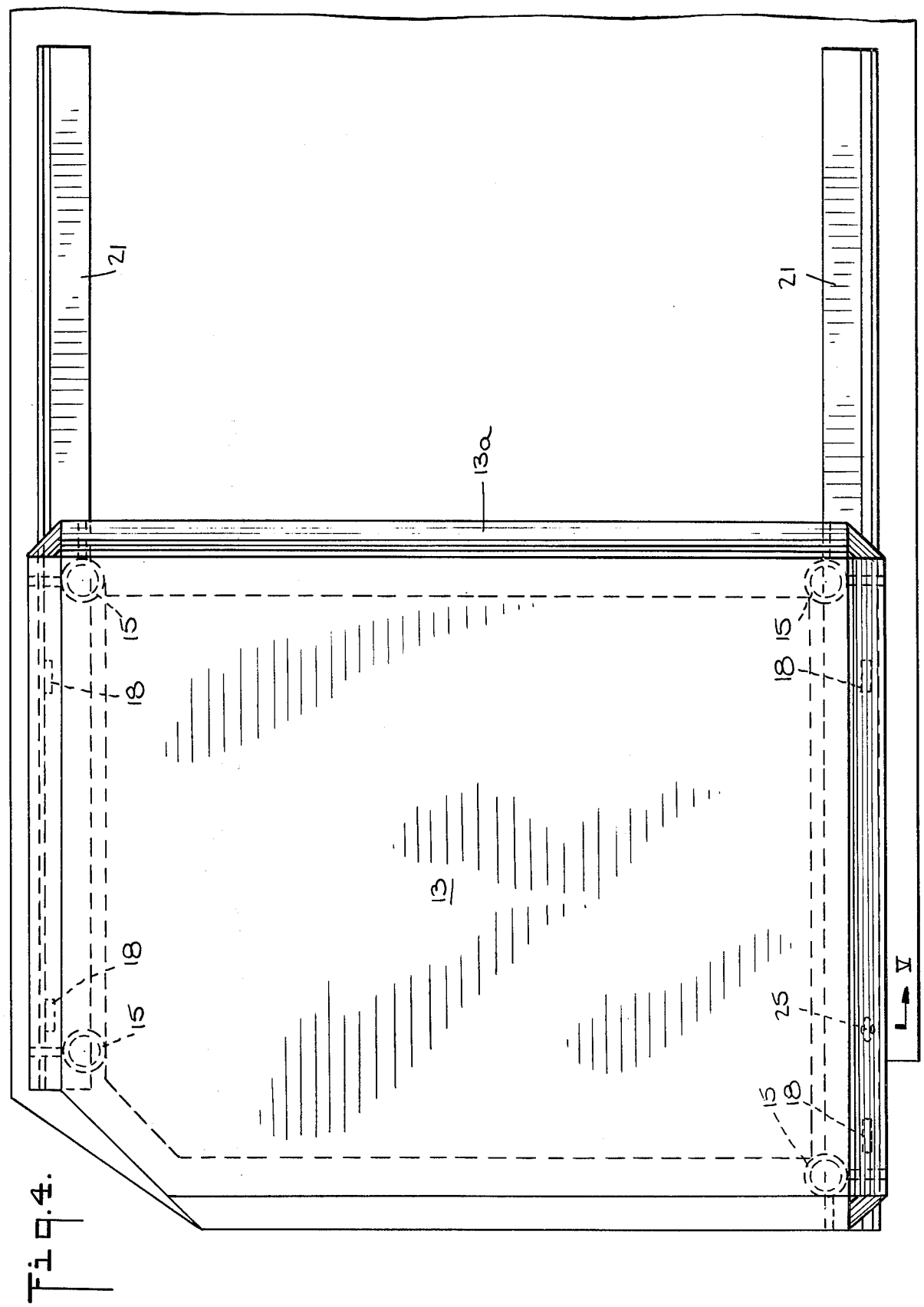

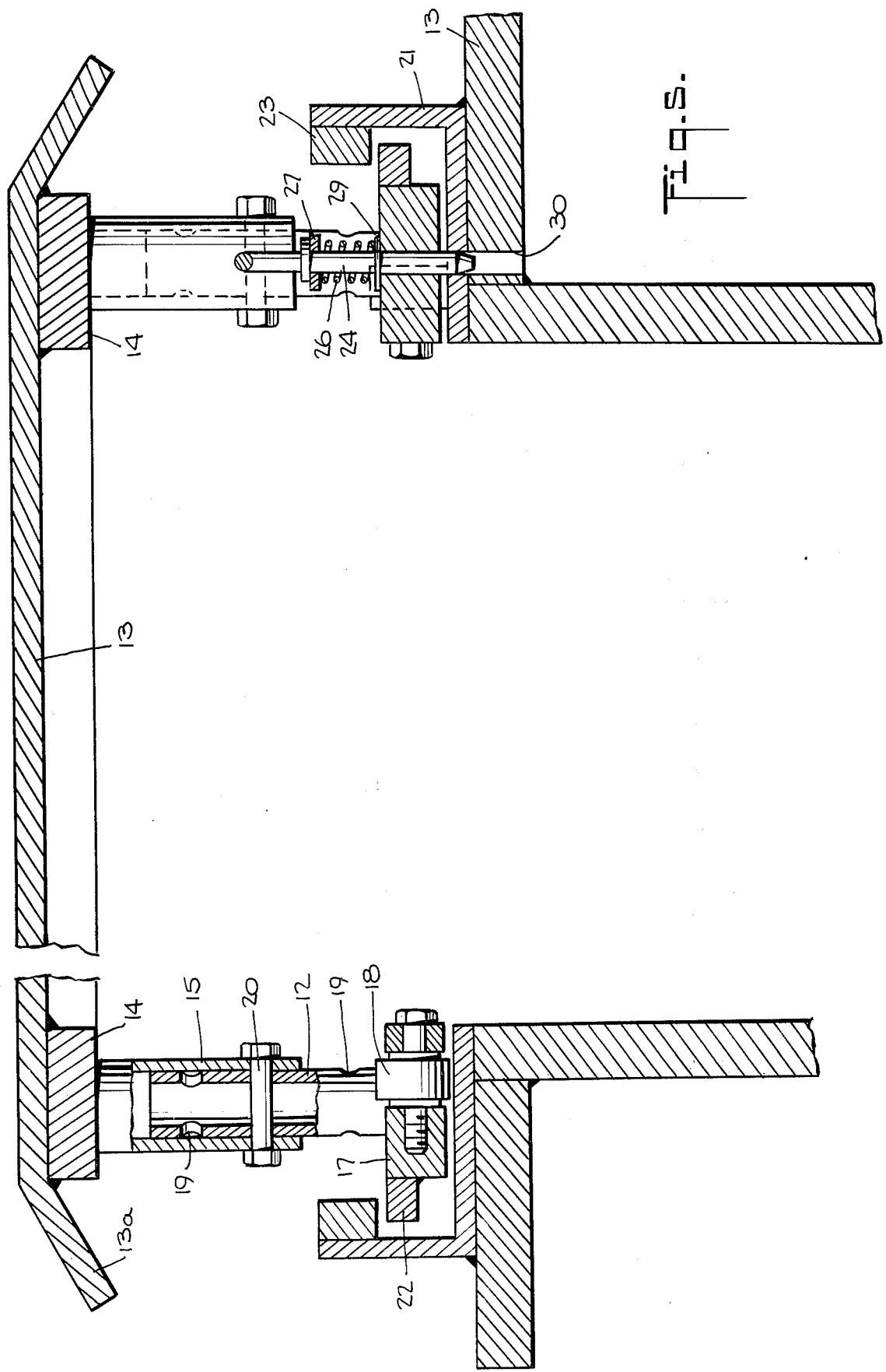

SHUTTLE CAR WITH OPERATOR PROTECTION

BACKGROUND OF THE INVENTION

This invention relates to the shuttle car disclosed by the Curry application Ser. No. 640,548 filed Dec. 15, 1975. That shuttle car comprises a tractor, a load-carrying trailer and a swivel interconnecting the tractor and trailer and positioned so that each can horizontally turn through a range of angularities relative to each other, the tractor and trailer each having a set of two wheels only, so that they can respectively pivot on the wheels. One or both sets of the wheels are reversibly powered and steering means are provided for controlling the angularities of the tractor and trailer, to steer the shuttle car.

Both the tractor and trailer have a low profile so the shuttle car can run forwardly and reversely through a mine haulway and into and from a mine crosscut, permitting the shuttle car to be parked in a mine crosscut to permit passage of a second one of the shuttle cars going through the haulway.

The tractor must carry expensive equipment such as the torque-responsive reel, which reels in and pays out the electric cable through which the car is electrically powered along with a reversing electric motor for powering the car's wheel sets, necessarily through reduction and differential gearing, and other equipment, anyone of which can be damaged by rocks, coal and the like, in large pieces falling from the mine roof on the tractor. Therefore, the top of the tractor is formed by a thick steel plate construction adequate to resist the shock of such falling pieces as experience has shown might be encountered in a mine.

However, for the operator of the car, the tractor is provided with an open-top cockpit which extends transversely with respect to the tractor for about half the latter's width and in which the operator sits transversely with his head above the tractor top so that by turning his head he can look forwardly when the car is running forwardly and backwardly when the car is running reversely. Although the operator can duck when approaching an unusually low mine roof, he is exposed directly to falling coal, rock and the like.

An object of the present invention is to provide the shuttle car operator with overhead protection providing a redundancy of safety that is at least equal to that provided for the components of the shuttle car.

SUMMARY OF THE INVENTION

For such protection, the present invention provides a flat canopy made of thick steel plate and supported by the tractor's top above the canopy opening at a height forming open spaces through which the operator can look forwardly and backwardly. The canopy is made horizontally movable transversely with respect to the tractor so as to cover the cockpit opening when occupied by the operator, and so that the canopy can be slid from over the cockpit opening to provide the operator with easy entry and exit from the cockpit.

The canopy is made with four corner posts holding the canopy at an appropriate height and having lower ends which are interconnected on opposite front and back sides of the cockpit opening and provided with rollers to form what is, in effect, a carriage assembly, the tractor's top being provided with transversely extending guideways for the rollers. These roller posts are adjustable in height as desired by the operator or as demanded by the clearance provided by the haulway or crosscut of the mine, and means are provided for releasably locking the carriage arrangement against movement at least when the canopy is in its closed position over the cockpit.

The canopy and all of its components are massively designed. At the present time, the canopy is designed to be resistant to a nine ton load, this providing a redundancy of safety.

BRIEF DESCRIPTION OF THE DRAWINGS

The shuttle car with its canopy is illustrated by the accompanying drawings, in which:

FIG. 1 is a perspective view showing the shuttle car as it appears when making a sharp turn;

FIG. 3 is a side elevation of the canopy as viewed on the line III—III in FIG. 1;

FIG. 4 is a top plan view of the canopy construction of FIG. 3; and

FIG. 5 is a cross section taken on the line V—V in FIG. 4.

DETAILED DESCRIPTION OF THE INVENTION

Figure 2:
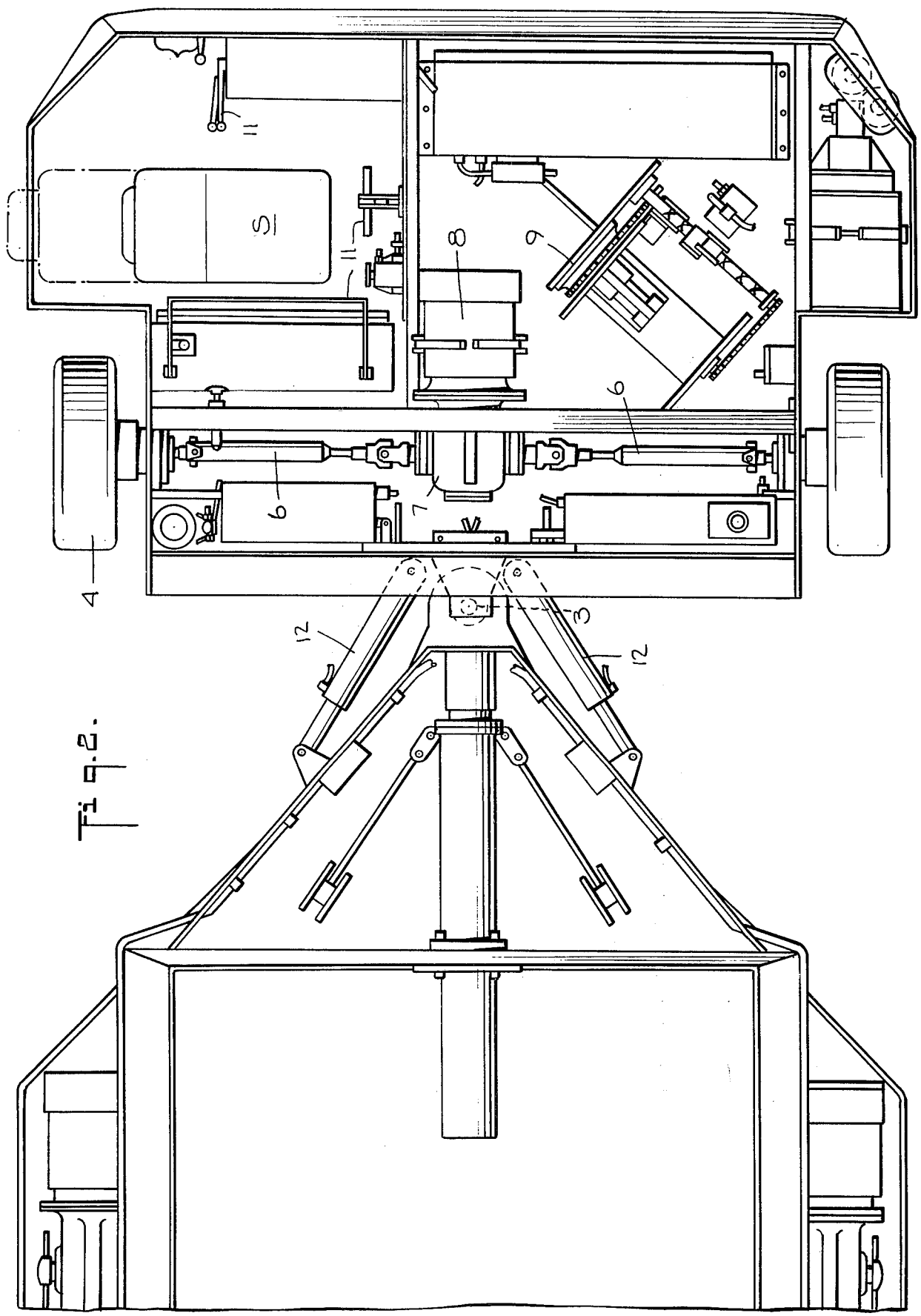
FIG. 2 is a plan view showing the tractor with its heavy steel plate top removed to illustrate some of the major components of the tractor normally protected by the horizontal car's top.

In FIG. 1 the shuttle car is shown in its turning position, the tractor being shown at 1 and the load-carrying trailer at 2. As shown by FIG. 2, the tractor and trailer are interconnected by a swivel 3, each running component having a single pair of wheels 4 and 5 respectively forming the front and rear sets of running wheels for the shuttle car. Each component can pivot individually on its set of wheels, their swivel interconnection restricting tilting of either the tractor or the trailer. The tractor wheels 4 are powered through drive shafts 6 by way of differential gearing in a gear box 7 and an electric motor 8 which drives through this gearing. The motor 8 receives its power via a running cable coiled and uncoiled by the torque-controlled electric cable reel 9. The indentification of these components is enough to show the reason why the tractor top is made with a flat thick steel plate construction top 10 shown in FIG. 1. The tractor components are protected very well against the shock and weight of heavy falling masses from the mine roof.

In FIG. 2 the operators transversely positioned seat is shown at S with various controllers generally indicated at 11, grouped around the seat and which, among other things, control the steering of the shuttle car by actuation of hydraulic rams 12 which change the relative angularities of the two running components and to control the motor 8 as to speed and rotation direction, the motor 8 being, of course, reversible. The operator sits on the seat S transversely with respect to the tractor and with his head above the tractor's top 10 so that by turning his head he can look either forwardly or backwardly. Because the flat top of the tractor is not shown in FIG. 2, the new canopy cannot be shown in this view.

Reference to FIGS. 1 and 3 through 5 do illustrate the new canopy. It is formed by a thick steel plate 13 which is large enough in area to completely cover the cockpit formed by the tractor's top opening 14 which extends for about half of the width of the tractor, and the floor of the tractor which supports the operator's seat S with the various controls 11 grouped around the seat. This steel plate has downwardly angled edge portions 13a inwardly of which heavy front and back rails 14 are welded to the bottom of the plate 13. These rails are each supported by two corner posts, so that there are four corner posts in all. These posts comprise heavy outer pipes 15 welded to the respective rails 14 and heavy inner tubular parts 16 which telescope within the parts 15 and have bottom ends welded to heavy front and back lower rails 17 in which rollers 18 are journaled at both ends in each instance.

For height adjustment, the inner tubular post parts 16, in each instance, are provided with a plurality of vertically interspaced holes 19, while the outer parts 15 are provided with holes through which a heavy bolt 20 is passed. By removing the bolts 20, the telescoping members can be slid up and down to the desired height and then securely locked against vertical displacement by use of the bolts 20.

In the above way the canopy is formed as a carriage assembly of great sturdiness and strength. For guideways, steel angle bars 21 have their horizontal legs welded to the tractor top 13 on either side of the cockpit opening, the tops of these horizontal legs forming running surfaces for the rollers 18 and which extend for substantially the full width of the top of the tractor. The vertical legs of the angle bars 21 serve to prevent the canopy carriage assembly from moving to far forwardly or backwardly, the front and back lower rails 17 of the canopy assembly, having bearing members 22 which bear against the vertical legs of the angle bars 21 if backward and forward motion, relative to the tractor direction, becomes too great. Preferably, the angle bars 21 have longitudinally extending rectangular bars 23 welded to them above the bearing members 22.

None of the running parts of the canopy carriage arrangements form close fits such as might become clogged with coal dust, dirt or the like. The rollers 18 run freely on the flat horizontal leg tops of the angle bars 21.

For locking the canopy in its closed position, one of the lower rails 17 is provided with a vertically slidable pin 24 having a lifting loop 25 and which is biased downwardly by a compression coil spring 26 which works between a bearing 27 formed by a bracket 28 welded to a lower side rail of the carriage assembly, and a collar 29 which is welded to the pin. The appropriate angle bar 21 and the top 13 of the tractor have a drill hole 30 for receiving the lower end of the pin 29 when the canopy is slid to its closed position.

The drawings of this application are approximately to scale and, therefore, indicate the simplicity of the canopy arrangement and the fact that all of the parts may be made very rugged and strong. The design load-carrying capacity is nine tons. All of the parts are, of course, made of steel and all of the fits are loose to avoid clogging problems. The height of the canopy above the tractor top is not only adjustable, as indicated by FIG. 3, but is made so through the use of simple and rugged telescoping steel tubular parts. All fixed connections are made by welding.

Note that the operation of the tractor is not hampered in any way by this new canopy. The space between the front and back edges of the canopy and the tractor top, provide complete vision in all directions. The cockpit being located on one side of the tractor, is made with an open end as shown at 31 in FIG. 1, and when the canopy is slid to its open position, the operator has easy access and exit to and from the cockpit. When the canopy is in its closed position, the operator of the tractor and the entire tractor is completely protected against falling masses.

It should be noted that because both the tractor top and the canopy are made of flat steel plate, the spacing of the canopy above the tractor top provides the operator with substantially free vision in all directions. Only the four posts are in the way of the operator's field of view, and these do not restrict that field in an appreciable manner. Therefore, when maneuvering the mine car into and from mine cross cuts, the operator is not hampered by the new canopy, while enjoying the protection provided by the new canopy.

What is claimed is:

1. A mine shuttle car comprising a tractor, a load-carrying trailer, a swivel interconnecting the tractor and trailer, said swivel being positioned so that the tractor and trailer can each horizontally turn through a range of angularities relative to each other, front and rear sets of running wheels supporting the tractor and trailer respectively, each of said sets comprising two wheels only so that the tractor and trailer can each horizontally pivot on its set of wheels, reversible wheel power means for powering at least one of said sets, steering means for controlling said angularities to steer the shuttle car, said tractor and trailer having a low profile so the shuttle car can run forwardly and reversingly through a mine haulway and into and from a mine crossout, and said tractor having a substantially flat top through which from one side of the tractor an opening extends transversely from that side for a part of the tractor's width and below which the tractor forms a cockpit having controllers for at least said wheel power and steering means and a support on which the operator can sit transversely on the tractor with at least his head above the tractor's top so he can look forwardly and backwardly, and a flat canopy for said opening and supported by the tractor's said top at a height forming open spaces through which the operator can look forwardly and backwardly, said canopy being horizontally movable transversely with respect to the tractor so as to cover and uncover said opening, the tractor's top and said canopy being made of steel plate.

2. The shuttle car of claim 1 in which said canopy has corner posts holding it at said height and having lower ends which are interconnected on opposite front and back sides of said opening and provided with rollers to form a carriage assembly, and the tractor's said top has transversely extending guidways for said rollers.

3. The shuttle car of claim 2 in which said corner posts are adjustable in height.

4. The shuttle car of claim 3 in which means are provided for releasably locking said carriage assembly against movement.

* * * * *